(12) United States Patent
Koga

(10) Patent No.: US 6,646,759 B1
(45) Date of Patent: *Nov. 11, 2003

(54) PRINTING APPARATUS AND IMAGE OUTPUT CONTROL APPARATUS FOR PROCESSING IMAGE DATA USING A DITHER PATTERN

(75) Inventor: Hiroshi Koga, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/856,174

(22) Filed: May 14, 1997

(30) Foreign Application Priority Data

May 15, 1996 (JP) .............................................. 8-120432

(51) Int. Cl.⁷ .............................................. G06K 15/00
(52) U.S. Cl. ...................................... 358/1.9; 358/3.06
(58) Field of Search ........................ 395/1.9, 102, 114; 358/457, 534, 535, 536, 429, 455, 456, 458, 459, 466, 298, 2.1, 3, 3.01–3.06, 3.13–3.19, 3.21–3.23, 504, 406; 382/162, 264, 252, 237, 254, 270; 345/527, 596, 597, 598

(56) References Cited

U.S. PATENT DOCUMENTS

| | | | | |
|---|---|---|---|---|
| 4,713,684 A | * | 12/1987 | Kawamura et al. ............ 358/78 |
| 4,837,613 A | * | 6/1989 | Paxton et al. ................ 358/515 |
| 4,926,251 A | * | 5/1990 | Sekizawa et al. ............ 358/535 |
| 5,182,652 A | * | 1/1993 | Stephenson, III ........... 358/296 |
| 5,339,170 A | * | 8/1994 | Fan .............................. 382/264 |
| 5,371,873 A | * | 12/1994 | Niwa .......................... 395/425 |
| 5,555,102 A | * | 9/1996 | Dalton ........................ 358/456 |
| 5,689,291 A | * | 11/1997 | Tence et al. ................... 347/10 |
| 5,699,102 A | * | 12/1997 | Ng et al. ..................... 347/224 |
| 5,734,369 A | * | 3/1998 | Priem et al. ................. 345/155 |
| 5,802,212 A | * | 9/1998 | Shu et al. .................... 382/237 |
| 5,875,287 A | * | 2/1999 | Li et al. ....................... 395/109 |
| 5,905,906 A | * | 5/1999 | Goffinet ..................... 358/1.15 |
| 5,912,745 A | * | 6/1999 | Ulichney .................... 358/457 |
| 5,918,988 A | * | 7/1999 | H.A.M. Van Oijen ...... 395/114 |
| 6,262,817 B1 | * | 7/2001 | Sato et al. ................... 358/518 |

* cited by examiner

*Primary Examiner*—Gabriel Garcia
*Assistant Examiner*—King Y. Poon
(74) *Attorney, Agent, or Firm*—Fitzpatrick, Cella, Harper & Scinto

(57) ABSTRACT

A printing apparatus is made up of a communicating device for performing a two-way communication with a host system and a dither processing unit for performing a dithering process to inputted image data and forming binary image data on the basis of information regarding an image output transmitted to the host system through the communicating device. The information regarding the image output is at least one of a drawing output of figure/characters, a color, and a gradation expression output. The printing apparatus further has a unit for receiving obtaining instruction information to obtain dithering pattern information in the dither processing unit from the host system through the communicating device and a unit for transmitting the dithering pattern information to the host system through the communicating device in response to the obtaining instruction.

22 Claims, 8 Drawing Sheets

PRINTING APPARATUS AND IMAGE OUTPUT CONTROL APPARATUS FOR PROCESSING IMAGE DATA USING A DITHER PATTERN

BACKGROUND OF THE INVENTION

1. Field of the Invention

The invention relates to a printing apparatus and an image output control apparatus to realize what is called WYSIWYG (What You See Is What You Get) in which, for instance, when a color image (multivalue image) pattern is converted into a binary image pattern to express the color image pattern in a monochromatic color or a monochromatic color of CMYK or the like or in a few colors in a printing apparatus, particularly, a print result from a printer with regard to a pattern output and a display output by a display are made coincide.

2. Related Background Art

On a system constructed of a display apparatus (display) and a printing apparatus (printer) which are connected to a conventional host system, in case of realizing a coincidence between a display output on the display regarding a pattern drawing output and a print result by the printer, the following methods are needed.

(1) A method whereby in a display control program (display driver) and a printer control program (printer driver), a dithering pattern installed on each apparatus is prepared in each driver, image data to be formed is falsely developed into a pattern image independently in each apparatus by a pattern drawing application including a figure and characters on the host system, and the developed image is transmitted as a bit map image to both of the printer and the display and is outputted as a bit map image.

(2) A method whereby in the display, by a pattern drawing application including a figure and characters on a host system, image data to be formed is developed into a pattern image composed of planes, lines, color, and gradations to form a figure and characters which are closest to the image data which can be outputted by the display through the display driver and the developed pattern image is displayed and outputted, while in the printer, the image data to be formed is developed into a pattern image composed of planes, lines, color, and gradations forming a figure and characters which are closest to the image data which can be outputted by the printer through the printer driver and the developed pattern image is printed and outputted.

The above conventional methods, however, have the following problems in case of realizing a coincidence between the display output by the display regarding the pattern drawing output and the print result by the printer.

(1) Dithering pattern (dither matrix) information installed in the display and printer is provided in the display driver and printer driver on the host system and a pattern image developing process is executed with respect to each apparatus, so that a memory amount which is consumed in a data area of each driver is large. In case of controlling a plurality of apparatuses by one driver, on the other hand, a plurality of dithering pattern (dither matrix) information are provided for each apparatus and the operation and the kind of apparatus are discriminated and the pattern image developing process is performed, so that the processes become complicated and a processing speed performance also deteriorates.

(2) By the pattern drawing application including a figure and characters on the host system, in the display driver and the printer driver, the image data to be formed is developed into the pattern image composed of planes, lines, color, and gradations forming a figure and characters which are closest to the image data in each apparatus or the image data is falsely developed into the pattern image, and the developed pattern image is outputted to the display or printer. Therefore, with regard to the pattern output, the true WYSIWYG in which the display output result and the print result are made coincide cannot be realized.

SUMMARY OF THE INVENTION

The invention is made in consideration of the above conventional apparatuses and it is an object of the invention to provide a system in which the same dithering pattern as a dithering pattern installed in a printer or a printer driver is also used on a display and image pattern forming and drawing processes are executed, thereby making a display output from the display and a print result from the printer coincident, and to solve the above problems by realizing WYSIWYG.

Another object of the invention is to provide an efficient apparatus with respect to an image output.

To accomplish the above objects, the present invention comprises the following construction and operation.

That is, according to the first embodiment of the invention, there is provided a printing apparatus comprising: communicating means for performing a two-way communication with a host system; and dither processing means for dithering input image data and forming binary image data on the basis of information regarding an image output inputted from the host system through the communicating means.

In addition to the first embodiment, there is also provided a printing apparatus wherein the information regarding the image output is at least one of a drawing output of figure/characters and a color and gradation expression output.

In addition to the first embodiment, there is also provided a printing apparatus further comprising: means for receiving obtaining instruction information to obtain the dithering pattern information in the dither processing means from the host system through the communicating means; and means for transmitting the dithering pattern information to the host system through the communicating means in response to the obtaining instruction.

There is also provided a printing apparatus wherein the transmitting means adds correction information to the dithering pattern information and transmits the resultant information.

According to another embodiment of the invention, there is provided an image output control apparatus comprising: means for transmitting an instruction notification to obtain dithering pattern information to a printing apparatus through communicating means; means for receiving the dithering pattern information transmitted through the communicating means in response to the instruction notification from the printing apparatus; and means for developing image data by using the received dithering pattern information from the printing apparatus and supplying the developed image data to a display apparatus.

There is further provided an image output control apparatus comprising: means for analyzing setting information regarding an image output to a printing apparatus and image data; drawing control means for determining an output format from dithering pattern information obtained from the printing apparatus through communicating means and the setting information composed of a pattern on the basis of the setting information and an analysis result regarding image data and for forming a binary image pattern; means for converting and forming a control instruction to allow the printing apparatus to draw and output the determined output form and the formed binary image pattern; and means for transmitting the control instruction to the printing apparatus through the communicating means.

There is also provided an image output control apparatus further comprising means for forming dithering pattern data which can be recognized on an operating system for making the host system operative on the basis of dithering pattern information obtained from a printing apparatus.

There is also provided an image output control apparatus comprising: drawing control means for forming a binary image pattern by using dithering pattern information obtained through communicating means; and means for converting the formed binary image pattern into a luminance signal of a display apparatus, transmitting the luminance signal to the display apparatus, and allowing the display apparatus to display and output the same image pattern as an image pattern installed in a printing apparatus.

There is also provided an image output control apparatus comprising: communicating means for performing a two-way communication with a printing apparatus; and means for performing a dithering process on the basis of dithering pattern information inputted from the printing apparatus through the communicating means.

According to the invention, for example, a two-way communication is performed between the printer and the printer driver on the host system, the printer driver obtains (up-loads) the dithering pattern (dither matrix) information installed in the printer, the pattern information is made recognized on the host system, and the image pattern formed by the dithering pattern is reproduced on the display driver on the basis of input data from the outside and is displayed and outputted to the display. On the other hand, by printing the image pattern formed by the same dithering pattern, the printer operates so as to make the display output and the print result coincide.

According to further another embodiment of the invention, there is provided an image output control apparatus in which a display driver or an operating system to display executes a developing process by using a dithering pattern which is used by a printer or a printer driver, thereby enabling a display image equivalent to a print image to be obtained.

Further another object of the invention is to provide a print control method in the foregoing printing apparatuses, a control method in the foregoing image output control apparatuses, and a storage medium in which programs for those control methods have been stored.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described in detail hereinbelow with reference to the drawings.

Embodiment 1

In a system constructed of a host system and a printing apparatus (printer) and a display apparatus (display) which are connected to the host system, there is shown an example hereinbelow in which dithering pattern (dither matrix) information installed in the printer is obtained by a printer control program (printer driver) provided in a program memory of the host system by a two-way communication control process, a pattern printing operation to the printer is executed on the basis of the dither matrix information and external input data, and a pattern display output to the display is executed by a display control program (display driver) provided likewise in the program memory of the host system by using the same dithering pattern.

Figure 1:
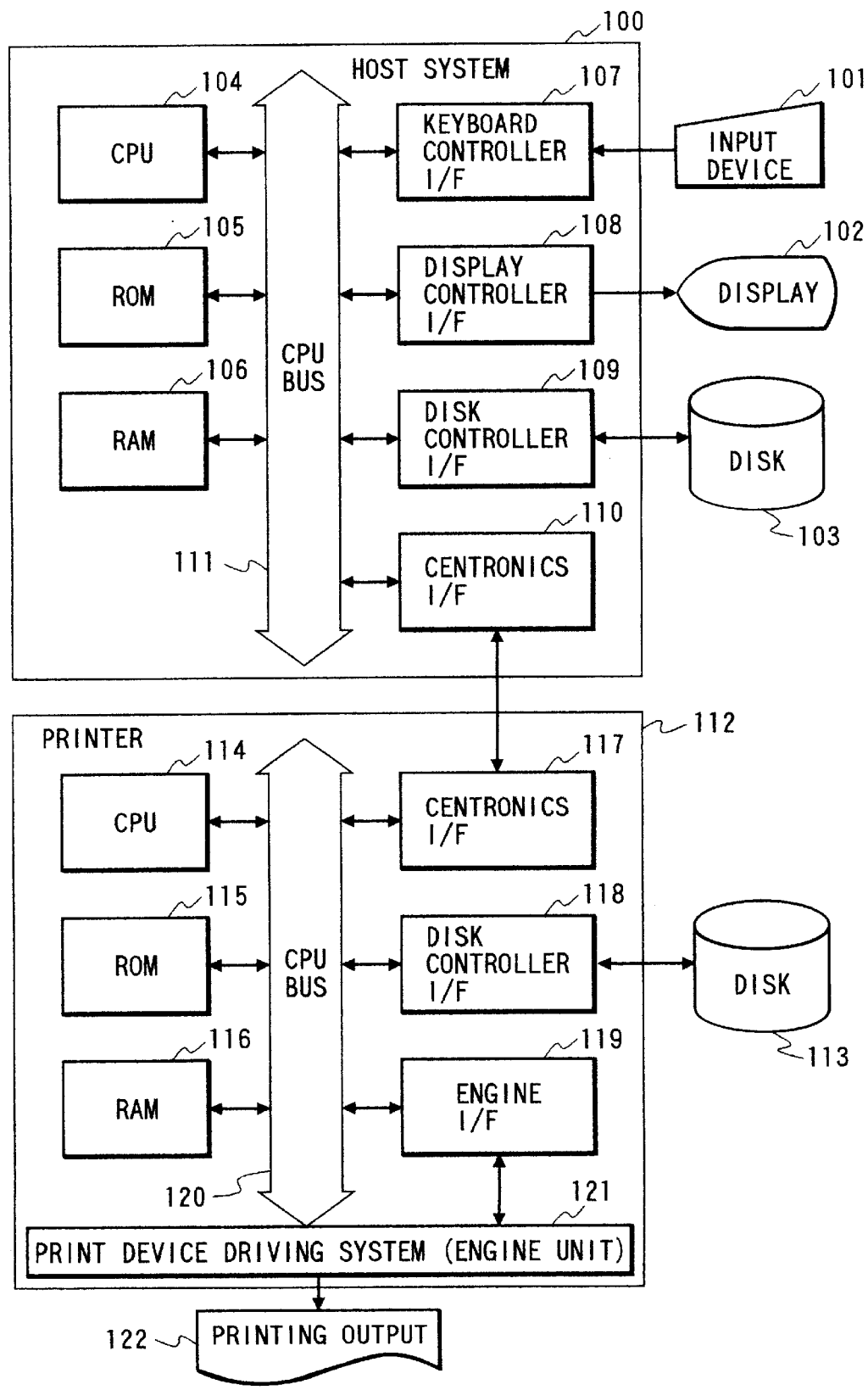
FIG. 1 is a fundamental constructional diagram of an embodiment according to the invention.

Explanation of a Construction of a Pattern Output Control Apparatus Regarding the Printing Apparatus and the Display Apparatus (FIG. 1)

FIG. 1 is a fundamental constructional diagram of an embodiment (and common to other embodiments) and is a diagram showing most preferably a feature of the embodiment.

In a system comprising: a host system 100; an input device 101 such as keyboard, mouse, etc. for inputting to the host system; a display apparatus (display) 102 for displaying and outputting; a disk 103 for inputting and outputting a file; and a printing apparatus (printer) 112 connected to the host system 100, the following processes are executed in a printer control program (printer driver) which is provided in a program memory (RAM) 106 in the host system 100 and is used to realize a pattern output control method of the invention: that is, a dedicated two-way communication control process which is executed between the host system and the printer; a process for obtaining dithering pattern (dither matrix) information installed in the printer by using the two-way communication; an information converting process for enabling the obtained information to be recognized by a fundamental program (operating system) and a display control program (display driver); and processes for converting into and forming a printer control instruction and allowing the image pattern to be drawn and outputted by the printer. In the display control program (display driver) likewise provided in the program memory (RAM) 106 in the host system 100, there are executed processes for similarly forming an image pattern from the same dithering pattern converted on the operating system so that it can be recognized, converting into and forming a luminance signal, and displaying and outputting by the display.

In FIG. 1, a construction of the host system 100 will be further described in detail. Reference numeral 104 denotes a CPU for executing a series of processes such as control of the host system and input/output devices connected thereto, output control according to an inputted instruction, and the like and for executing various programs; 105 an ROM serving as a memory to store various fundamental programs such as an operating system to make the CPU 104 operative and the like; and 106 the RAM serving as a memory which is used as a work area for various processes for the CPU 104 to execute and make operative the dedicated two-way communication control to realize a pattern output control method according to the invention, printer driver, display driver, and the like. Information regarding a pattern output which is executed from the outside to the printer driver and the printer 112, application programs for inputting an instruction and instructing a printing operation, and the like are also stored in the RAM 106. Reference numeral 107 denotes a keyboard controller which is connected to the host system 100 and has an interface of the input device 101 such as keyboard, mouse, or the like for inputting; 108 a display controller having an interface for displaying and outputting to the display 102; 109 a disk controller having an input/output interface to/from the disk 103; 110 an input/output parallel interface (Centronics I/F) based on the Centronics having a dedicated two-way communication protocol for connecting the host system 100 and printer 112 and executing a communication; and 111 a CPU bus for connecting the respective component elements.

A construction of the printer 112 will now be described in detail. Reference numeral 114 denotes a CPU for executing programs for a control of each of the input/output devices connected to the printer, a series of processes such as a print control according to the inputted instruction and the like, a communication control process, and the like; and 115 an ROM serving as a memory in which programs for making the printer operative such as control of each of the input/output devices, a communication control process, a series of processes for a print control according to an inputted instruction and the like, control command analyzing process, and the like, various attribute information regarding a pattern output, dithering pattern constructing data, various data, and the like have been stored. Reference numeral 116 denotes an RAM serving as a memory which is used as a work area for the CPU 114 to execute and perform processes by the various programs; 117 an input/output parallel interface (Centronics I/F) based on the Centronics having a dedicated two-way communication protocol for transmitting and receiving data by connecting the host system 100 and printer 112; 118 a disk controller having an input/output interface for a disk 113 in which various data has been stored in a manner similar to the ROM 115; 119 an engine control processing unit (engine I/F) having an input/output interface for transmitting and receiving data and a signal to/from a print device driving system (engine unit) 121 for mechanically outputting a pattern; and 120 a CPU bus for connecting the respective component elements.

A control process and the operation of the printer control program (printer driver) existing in the program memory RAM 106 in the host system 100 will now be described in detail.

The printer control program (printer driver) for realizing a pattern output control method according to the invention existing in the program memory RAM 106 in the host system is activated by a pattern output instruction from a pattern input program such as a pattern drawing application program including a figure and characteristics likewise existing in the RAM 106.

First, a control instruction to initialize the printer is transmitted in order to perform the print control of the printer by a printer initializing process.

Subsequently, a dedicated two-way communication control process is performed to the printer 112 in a dithering pattern (dither matrix) information obtaining instruction transmitting process installed in the printer 112 by the character input program, thereby transmitting the obtaining instruction of the dithering pattern information installed in the printer 112. The obtaining instruction can be transmitted in a printer control instruction format or as a signal.

The two-way communication control process is performed from the printer 112 and the information is received and stored into the RAM 106 or a storage control apparatus of the disk 103 by the information receiving process.

The information stored in the storage control apparatus is subjected to an information converting process in order to convert into a data format which can be recognized on the operating system of the host system and the display control program (display driver). The converted information is likewise stored into the RAM 106 or the storage control apparatus of the disk 103.

From the pattern input program existing in the RAM 106, a series of processes are executed in the following processes: a data and various setting information inputting process for performing a process to input pattern data of the figure and characters, size, drawing output start position, and the like for allowing the printer to print; an input data and information analyzing process for analyzing the pattern data, setting information, and the like which were inputted; a drawing output format control process for determining a drawing output format of a pattern constructed on the basis of each setting parameter to instruct the size, drawing output format, or the like; an output control instruction converting process for converting and forming a printer control instruction of the printer 112 in order to print the determined pattern; and an output control instruction transmission control process for transmitting the formed print output control instruction to the printer. The pattern is outputted from the printer 112.

Similarly, a control process and the operation of the display control program (display driver) existing in the program memory RAM 106 in the host system 100 will now be described in detail.

The display control program (display driver) to realize the pattern output control method of the invention existing in the RAM 106 in the host system 100 is activated by a pattern output instruction from the pattern input program such as a pattern drawing application program including the figure and characteristics or the like similarly existing in the RAM 106.

First, the display is initialized in order to control a display output of the display in a display initializing process.

There are executed the following processes: a data and various setting information inputting process for reading (loading) a dithering pattern in the data format which can be recognized on the operating system of the host system and the display driver existing in the RAM 106 or the storage control apparatus of the disk 103 from the storage control apparatus by the printer driver and for performing a process to input the pattern data of the figure and characteristics, color, gradation, size, output start position, etc. to display and output to the display 102 from the pattern input program existing in the RAM 106; an input data and setting information analyzing process for analyzing the data, various setting information, and the like which were inputted; a display output format control process for determining a pattern display output format on the basis of each of the setting parameters to instruct the color, gradation, size, display output format, and the like and the dithering pattern information installed in the printer 112; an output signal converting process for forming an image pattern by using the dithering pattern in order to display and output the determined pattern and for converting into and forming the luminance signal; and an output transmission control process for transmitting the formed luminance signal to the display. The pattern is displayed and outputted from the display 102.

On the other hand, the transmitting operation of the dithering pattern information data installed in the printer 112 by the communication control process in the control program in the memory ROM 115 in the printer 112 will now be described in detail.

First, the control instruction to initialize the printer which is transmitted from the printer driver existing in the program memory RAM 106 in the host system 100 is received and the initializing process is performed.

Subsequently, the obtaining instruction of the information data transmitted from the printer driver existing in the program memory RAM 106 in the host system 100 by executing the two-way communication control process is received by the dithering pattern information data obtaining instruction receiving process installed in the printer 112.

The dithering pattern information data installed in the printing apparatus (printer) 112 is read out from the ROM 115 or disk 113 and transmitted to the RAM 106 in the host system 100 or the disk 103 via the printer driver by performing the two-way communication control process in the information data transmitting process.

The outputting operation of the pattern by the print output control process in the control program in the memory RAM 105 in the printing apparatus (printer) 112 will now be described in detail.

A series of processes are executed in the following processes: a print control instruction inputting process for inputting a printer print control instruction which is transmitted to the printing apparatus (printer) 112 from the printer driver in order to print; a control setting parameter analyzing process for analyzing the inputted printer print control instruction, various setting parameters, and the like; and a bit map developing process for forming a binary image pattern on the basis of the print control instruction, control setting parameter, and dithering pattern information and for developing into a bit map memory. The bit map data formed is transmitted to the print device driving system (engine unit) 121 through the input/output interface 119 existing in the engine I/F and a pattern is outputted (122).

Figure 2:
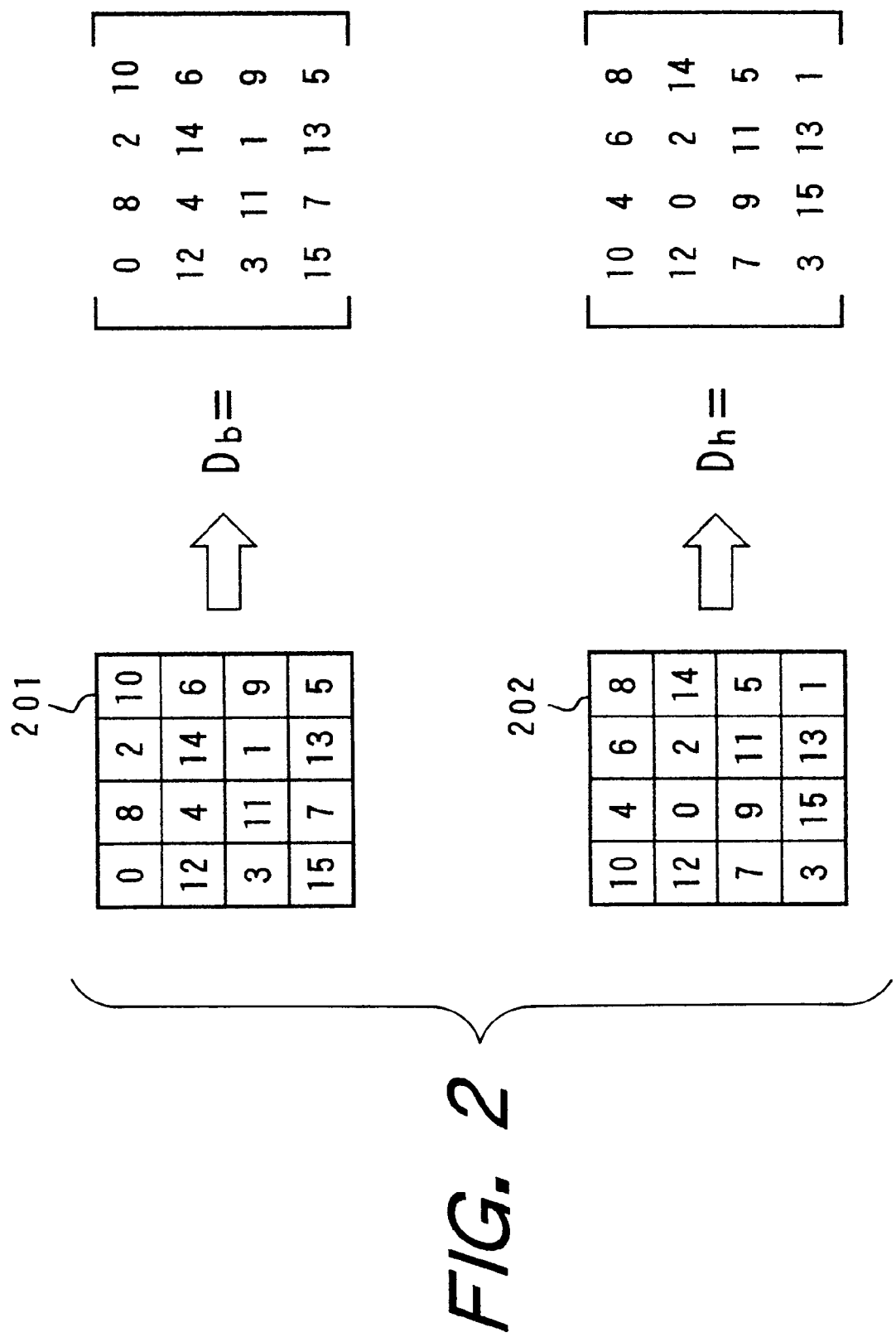
FIG. 2 is a diagram showing examples of dithering patterns similar to those which are used in the embodiment and dither matrices to quantitatively express them.

Dithering Pattern (FIG. 2)

FIG. 2 shows typical dithering patterns (dither matrices) which are generally well known. Reference numeral 201 denotes a Bayer type dithering pattern and a dither matrix $D_b$ obtained by quantitatively expressing such a dithering pattern. Reference numeral 202 denotes a Fattening type dithering pattern and a dither matrix $D_h$ obtained by quantitatively expressing such a dithering pattern. Matrix data in a similar form is installed and stored in the printing apparatus (printer). The information data of the dither matrix is transmitted (up-loaded) by the two-way communicating process in response to a request from the host system.

Although the dithering patterns of 4×4 have been shown above, a dithering pattern of 16×16, a blue noise type dithering pattern of a larger size, or the like can be also used.

Each Control Process in the Embodiment (FIGS. 3 to 7)

The printer control program (printer driver) existing in the program memory RAM 106 in the host system 100 and each control process existing in the program ROM 114 in the printing apparatus (printer) 112 according to the embodiment with the above construction will now be described in detail in accordance with flowcharts shown in FIGS. 3 to 7.

Figure 3:
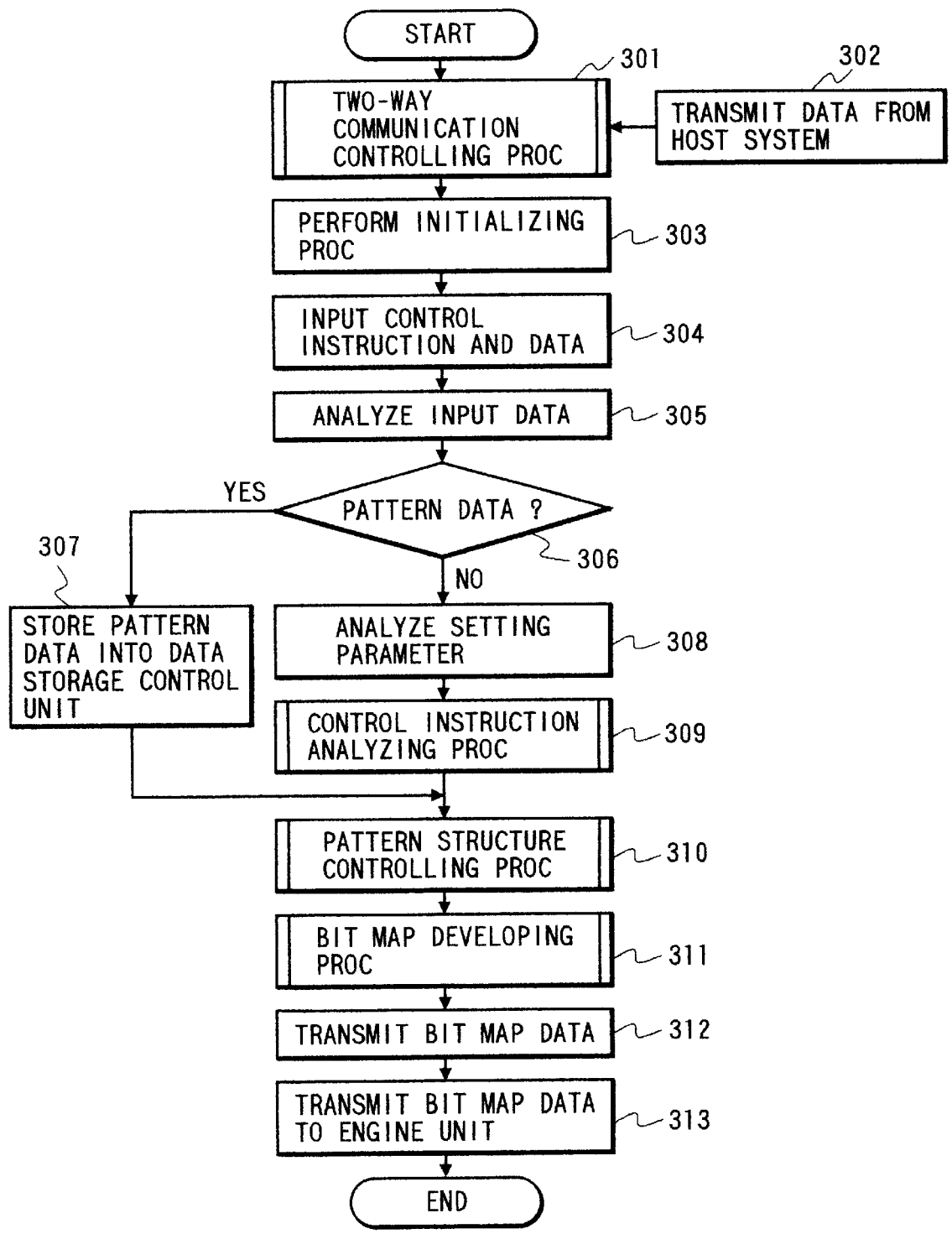
FIG. 3 is a flowchart showing an example of a two-way communication control process and a control process for outputting a pattern which are provided in a program memory of a printer according to the embodiment.

FIG. 3 is the flowchart showing a control process in the printing apparatus (printer) according to the embodiment.

Step 301 shows a two-way communication control process (module). In the input/output parallel interface based on the Centronics having a dedicated two-way communication protocol to communicate with the host system 100, a control process to match timings to transmit and receive data and timings to input and output signals is executed and the signal, various instructions, data, and the like which are transmitted from the host system (step 302) are received.

Step 303 relates to an initializing process to prepare for printing in the printer. A setting process to request a paper feeding method, an output paper size designation, and the like in the printer is previously performed. It is generally executed by receiving an initialization control instruction from the host system 100.

Step 304 denotes a process to input the print control instruction to output the pattern from the host system 100 and the figure and character pattern data. Such an inputting operation is performed by instructing the printer to print from the outside, for example, a pattern input program such as a pattern drawing application or the like via the printer driver existing in the program memory RAM 106 in the host system 100.

In step 305, a process to analyze the print control instruction, figure and character pattern data, and the like which were inputted is executed.

The print control instruction and data which were analyzed in step 305 are further separated into pattern data and each setting parameter in step 306.

The pattern data separated in step 306 (discrimination branch) is stored into a pattern data storage control unit in step 307, thereby preparing for the subsequent processes.

Similarly, the setting control parameter separated in step 306 (discrimination branch) is analyzed in step 308. In a control instruction analyzing process (module) in step 309, the figure and character type selection, output attributes such as color, gradation, and the like, size calculation, and output format of the pattern such as an output position or the like are determined on the basis of the setting parameter analyzed in step 308 and the print control instruction, thereby forming control data to output the pattern.

The pattern data stored in the pattern data storage control unit in step 307 and the control data for the pattern output which was analyzed and formed in step 308 are subjected to a process to determine a structure pattern, a format, and a layout for a paper page in a pattern structure control process (module) in step 310.

In a bit map developing process (module) in step 311, bit map data is formed from the binary image pattern on the basis of the structure pattern, format, and output attributes such as color, gradation, and the like which were determined by the pattern structure control process (module) in step 310 and the dithering pattern information and is developed into a page or print area band (band) memory.

The bit map data formed in the bit map developing process (module) in step 311 is transmitted to the print device driving system (engine unit) in step 312 (313) and the pattern is outputted.

Figure 4:
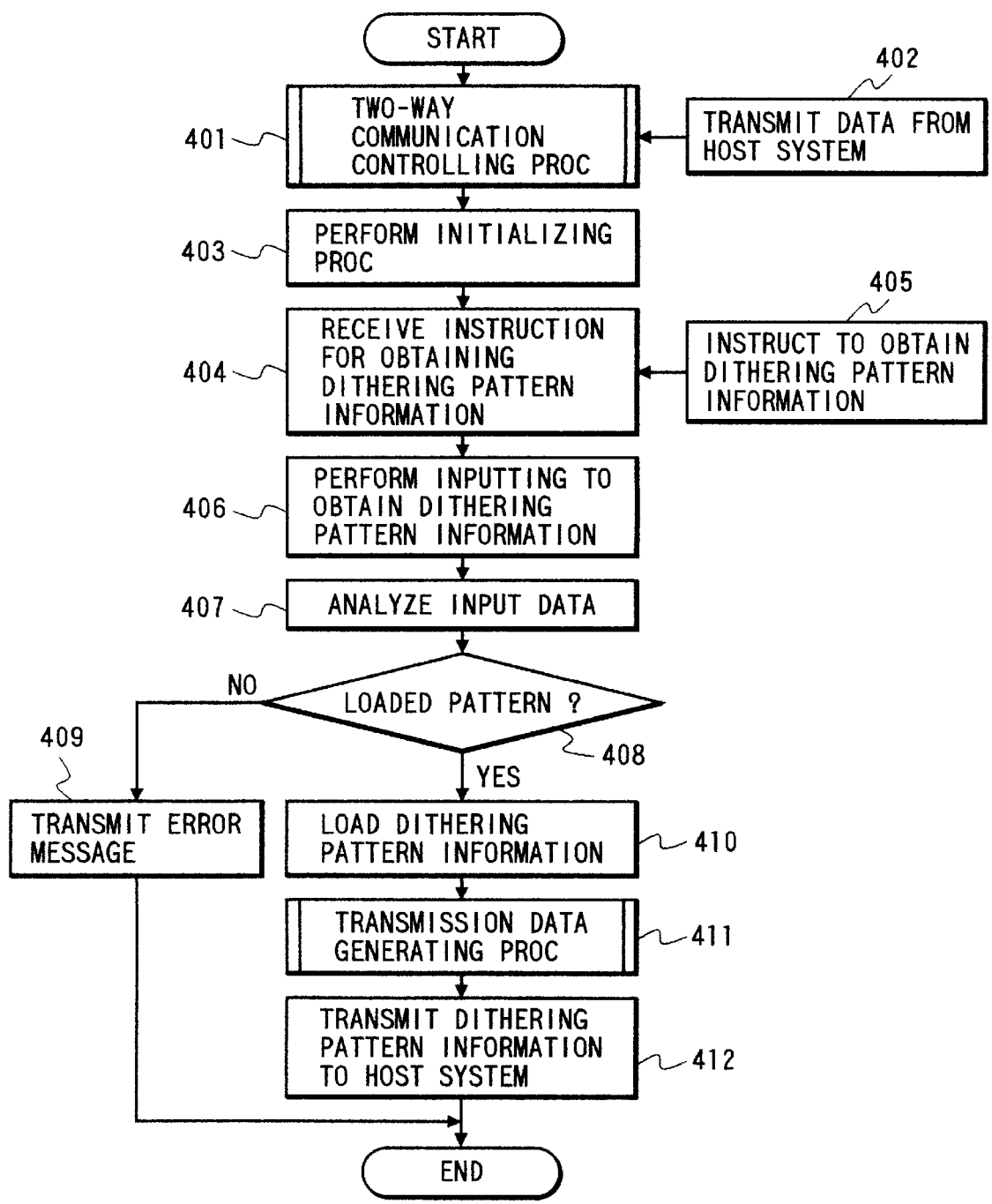
FIG. 4 is a flowchart showing an example of a two-way communication control process and a control process for transmitting dithering pattern information data to a host system which are provided in the program memory of the printer according to the embodiment.

FIG. 4 is the flowchart showing another control process in the printing apparatus (printer) according to the embodiment.

Step 401 relates to a two-way communication control process (module). In the I/O parallel interface based on the Centronics having the dedicated two-way communication protocol for communicating with the host system 100, a control process for matching timings to transmit and receive data and timings to input and output signals is executed. The signal, various instructions, data, and the like which are transmitted from the host system (step 402) are received.

Step 403 relates to an initializing process for preparation to up-load the dithering pattern information installed in the printer 112. This process is executed by receiving a signal or initialization control instruction from the host system 100.

In step 404, an obtaining instruction (step 405) about the dithering pattern information installed in the printer 112 which is transmitted from the host system 100 is received by performing the two-way communication control process (module) in step 401.

In step 406, an inputting operation to obtain the dithering pattern information installed in the printer 112 by the host system 100 is similarly executed from the host system 100. Input items include the kind of dithering pattern, attribute information, and the like which are obtained by the host system 100.

In step 407, a process to analyze the kind of dithering pattern, attribute information, and the like which were inputted in step 406 is performed.

In step 408 (discrimination branch), a check is made to see if the dithering pattern matched with the kind of dithering pattern and the attribute information which were inputted in step 406 has been installed.

In step 408 (discrimination branch), when it is determined that such a dithering pattern is not installed, an error message is transmitted to the host system in step 409.

Similarly, when it is determined in step 408 (discrimination branch) that the dithering pattern has been installed, the relevant dithering pattern information data is read out (loaded) from the RAM 116 in the printer 112 or the storage device of the hard disk 113 in step 410.

The loaded information data is converted into a predetermined format so as to be up-loaded into the host system 100 by a transmission data forming process (module) in step 411.

The formed dithering pattern information data is transmitted to the host system in step 412.

Figure 5:
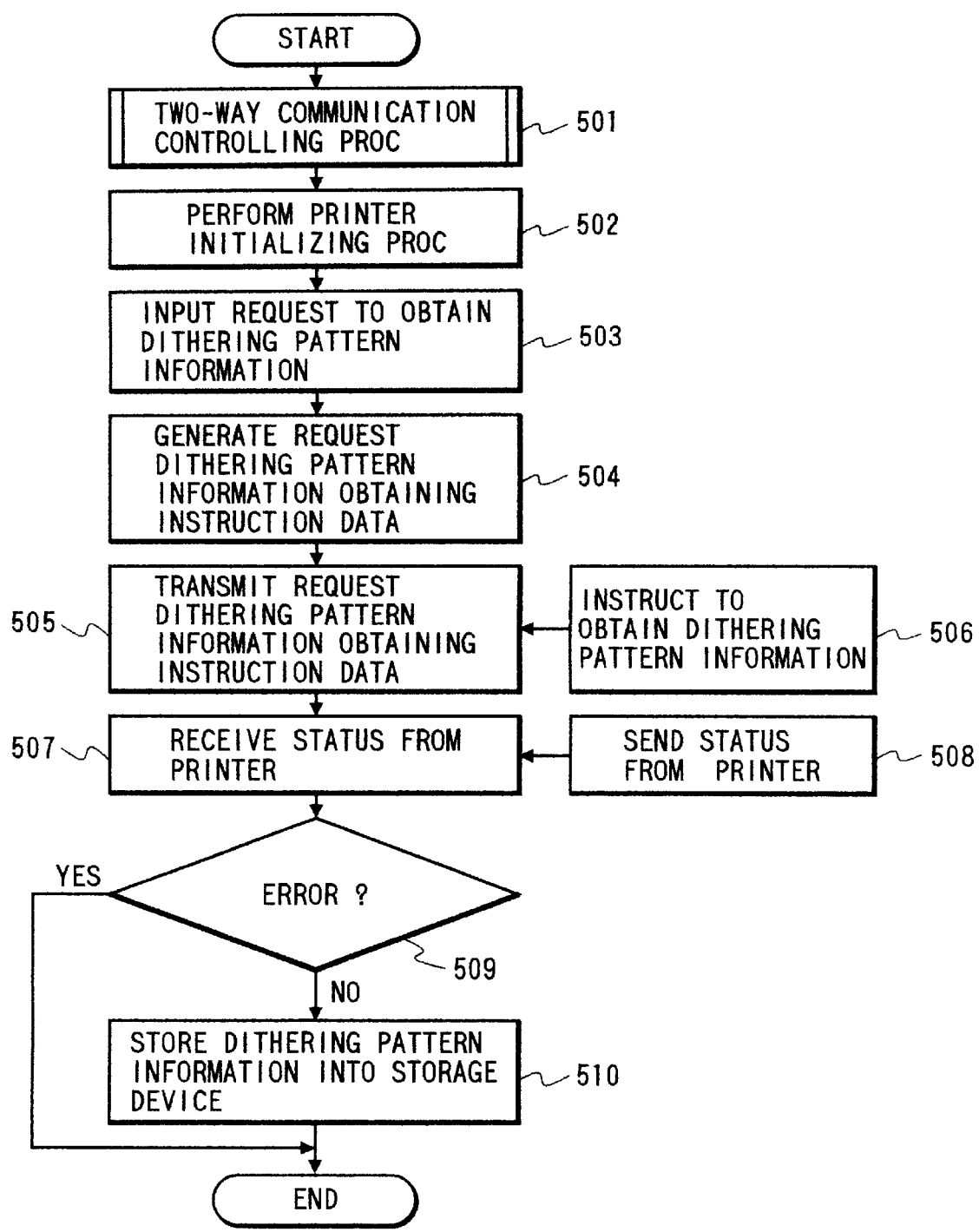
FIG. 5 is a flowchart showing an example of a two-way communication control process in a printer driver and a control process for obtaining dithering pattern information data from the printer which are provided in a program memory of a host system according to the embodiment.

FIG. 5 is the flowchart showing an example of a control process in the printer control program (printer driver) existing in the program memory RAM 106 in the host system 100.

In step 501, a process to control the transmission and reception of data is performed by the two-way communication control process (module) in the I/O parallel I/F based on the Centronics having the dedicated two-way communication protocol to communicate with the printer 112.

Step 502 relates to an initializing process for allowing the printer 112 to prepare for up-loading the data in order to obtain the dithering pattern information data which is installed in the printer 112. This process is performed by transmitting the printer initialization control instruction.

In step 503, the kind of dithering pattern, attribute information, and the like which are requested to obtain the dithering pattern information data which is installed in the printer 112 are inputted.

In step 504, request dithering pattern information data obtaining instruction data to transmit to the printer 112 is formed from the kind of dithering pattern and attribute information which were inputted in step 503. As a data format, a printer control instruction or a signal can be used.

In step 505, the transmission data formed in step 504 is transmitted as an obtaining instruction to the printer 112 (506).

In step 507, a status from the printer 112 is first received (508).

In step 509, a response status message indicating whether the designated dithering pattern has been installed in the printer 112 or not in response to the obtaining instruction 506 is discriminated.

As a result of the discrimination in step 509, when there is an error indicating that such a dithering pattern is not installed, the processing routine is finished. When the dithering pattern is installed, the dithering pattern information data to be subsequently obtained is received in step 510 and stored into the memory RAM 106 or the storage apparatus of the hard disk 103.

Figure 6:
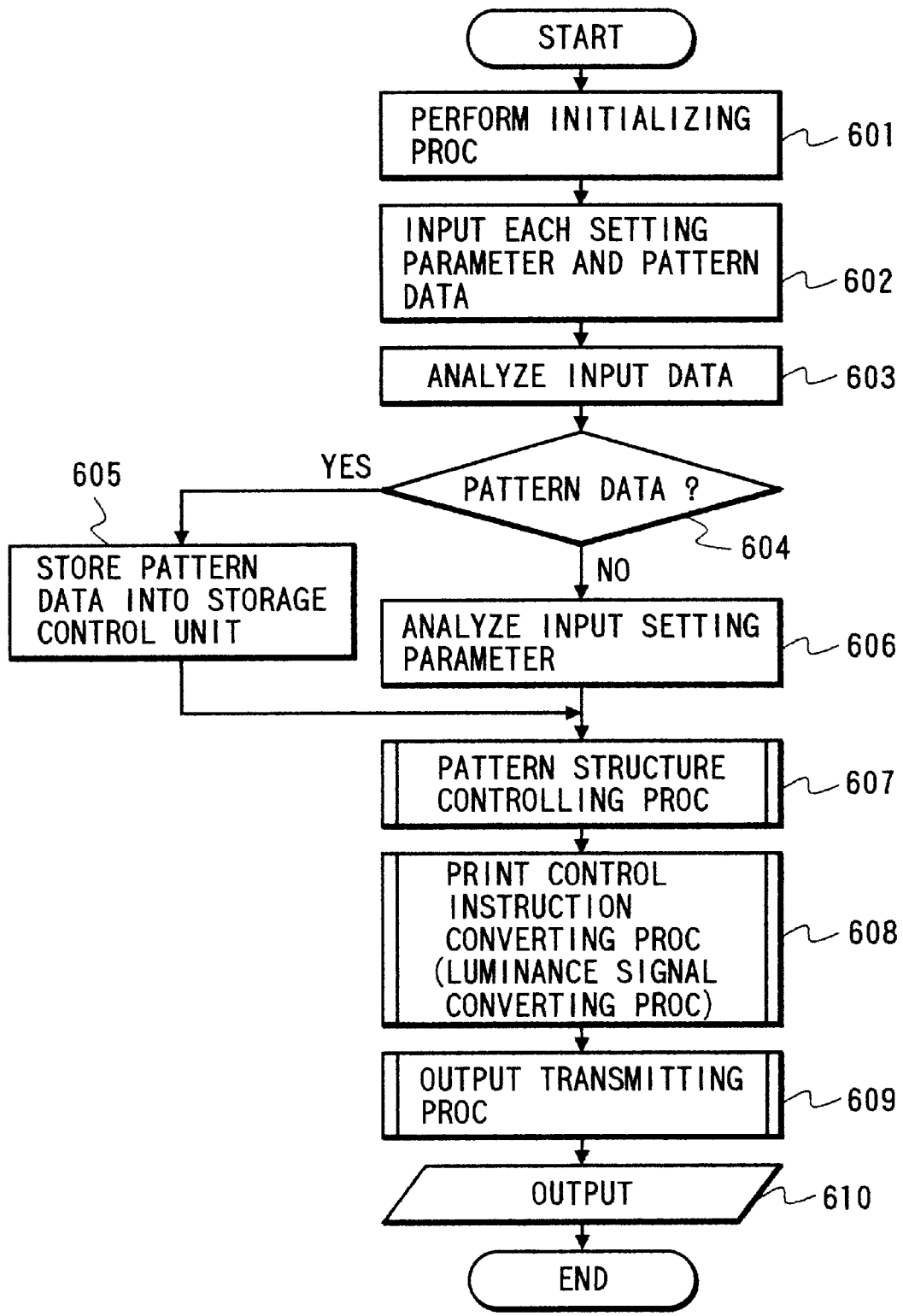
FIG. 6 is a flowchart showing an example of a pattern output control process in a printer driver and a display driver which is provided in the program memory of the host system according to the embodiment.

FIG. 6 is the flowchart showing an example of a control process in the printer control program (printer driver) and display control program (display driver) existing in the program memory RAM 106 in the host system 100 according to the embodiment.

The printer print control program (printer driver) is activated by a print instruction to the printer from the outside, for example, the pattern input program such as a pattern drawing application or the like. Steps 601 to 607 are executed.

First in step 601, for preparation of printing such as paper size, printing direction, drawing resolution setting, unit setting of coordinates system, and the like, setting parameters for the printer are converted into a printer control instruction and such an instruction is formed and transmitted, thereby initializing the printer.

In step 602, each setting parameter to designate a drawing output format of the pattern from the outside and the pattern data are set into the printer driver. Those setting parameters and pattern data are generally inputted directly from an application program to form a pattern or through the operating system.

In step 603, a process to analyze each setting parameter, pattern data, and the like which were inputted is executed.

The parameters and data which were analyzed in step 603 are further separated into the pattern data and each setting parameter in step 604.

The pattern data separated in step 604 (discrimination branch) is stored in the pattern data storage control unit in step 605, thereby preparing for the subsequent processes.

The input setting parameter separated in step 604 (discrimination branch) is analyzed in step 606.

As for the pattern data stored in the pattern data storage control unit in step 605, a pattern kind selection, drawing output attributes, size calculation, and an output format of the pattern such as a drawing output position or the like are determined on the basis of the input setting parameter analyzing process in step 606 in a pattern structure control process (module) in step 607 and the pattern data is arranged in an output paper page of the printer.

The foregoing control processes in steps 602 to 607 are also similarly executed in the display control program (display driver) existing in the program memory RAM 106 in the host system 100.

The printer driver converts the control data of the pattern constructed in step 607 into the print control instruction of the printer and forms such an instruction in order to output the pattern to the printer in the print control instruction converting process (module) in step 608.

In the output transmitting process (module) to the printer in step 609, the print control instruction formed in step 608 is transmitted to the printer 112 and the pattern is printed by the printer (610).

In the display driver, in step 607, on the basis of the dithering pattern information installed in the printer, the control data of the constructing pattern is developed into the bit map pattern and is transmitted as a luminance signal and the pattern is displayed and outputted to the display 102.

Figure 7:
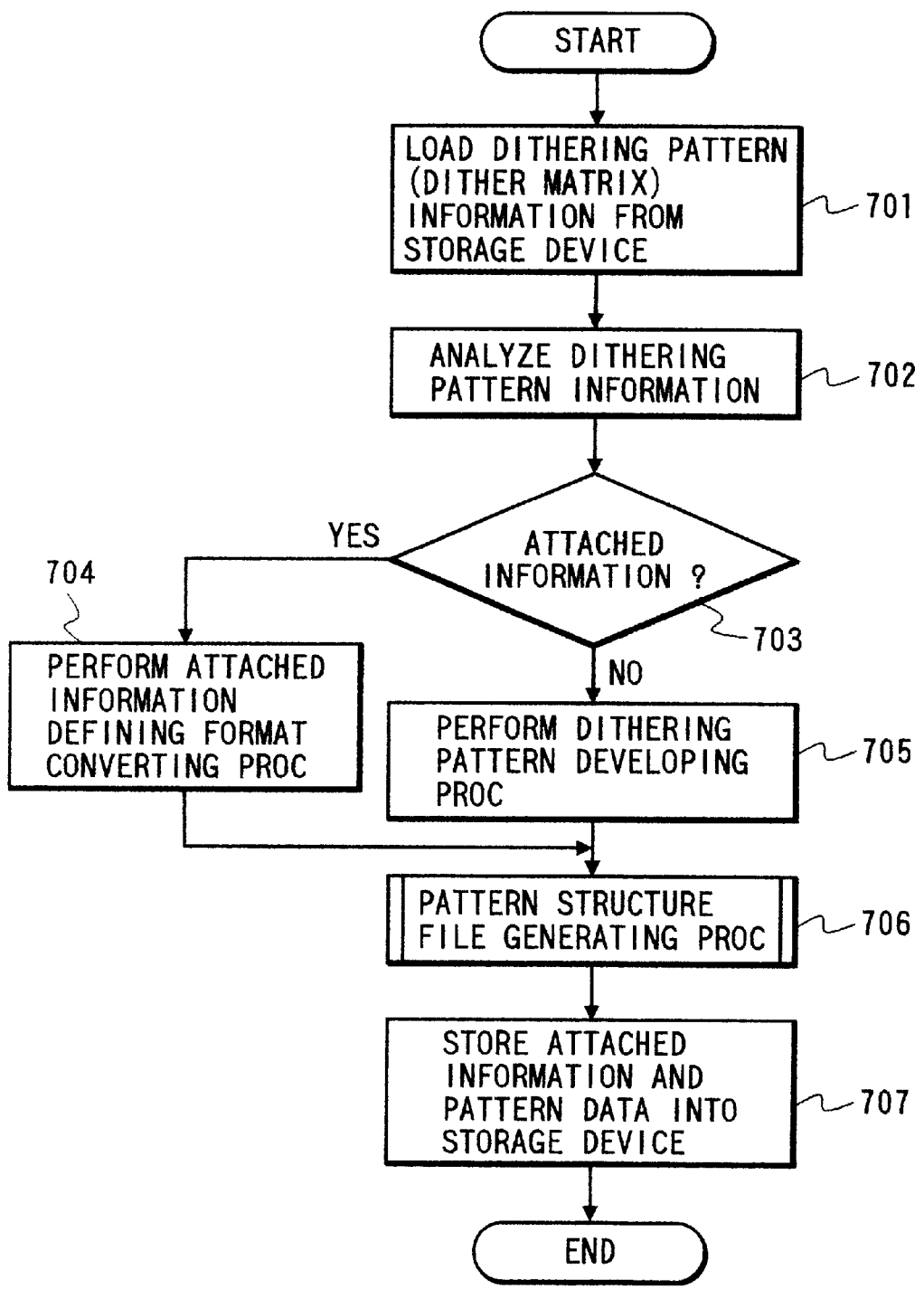
FIG. 7 is a flowchart showing an example of a dithering pattern information data converting process in the printer driver which is provided in the program memory of the host system according to the embodiment.

FIG. 7 is a flowchart showing another example of a control process in the printer control program (printer driver) existing in the program memory RAM 106 in the host system 100 according to the invention.

In step 701, the dithering pattern information which was up-loaded from the printer 112 to the host system 110 is read out (loaded) from the memory RAM 106 in the host system 100 or the storage device of the hard disk 103.

In step 702, the dithering pattern information loaded in step 701 is analyzed.

The information and data analyzed in step 702 are further separated into attached information and dithering pattern in step 703 (discrimination branch).

The attached information separated in step 703 (discrimination branch) is converted into a predetermined information format so that it can be recognized on the operating system as a fundamental program and the display driver in the program memory ROM 105 of the host system 100 in step 704, thereby preparing for the subsequent processes.

In the dithering pattern developing process (module) in step 705, the dithering pattern separated in step 703 (discrimination branch) is developed in a predetermined format so that it can be recognized on the operating system and display driver in a manner similar to that mentioned above.

In step 706, on the basis of the attached information converted into the predetermined format in step 704 and the dithering pattern developed in step 705, a pattern structure file forming process (module) to form a file of a pattern which can be recognized on the operating system and display driver.

In step 707, the pattern structure file formed in step 706 is likewise stored into the memory RAM 106 in the host system 100 or the storage device of the hard disk 103.

Figure 8:
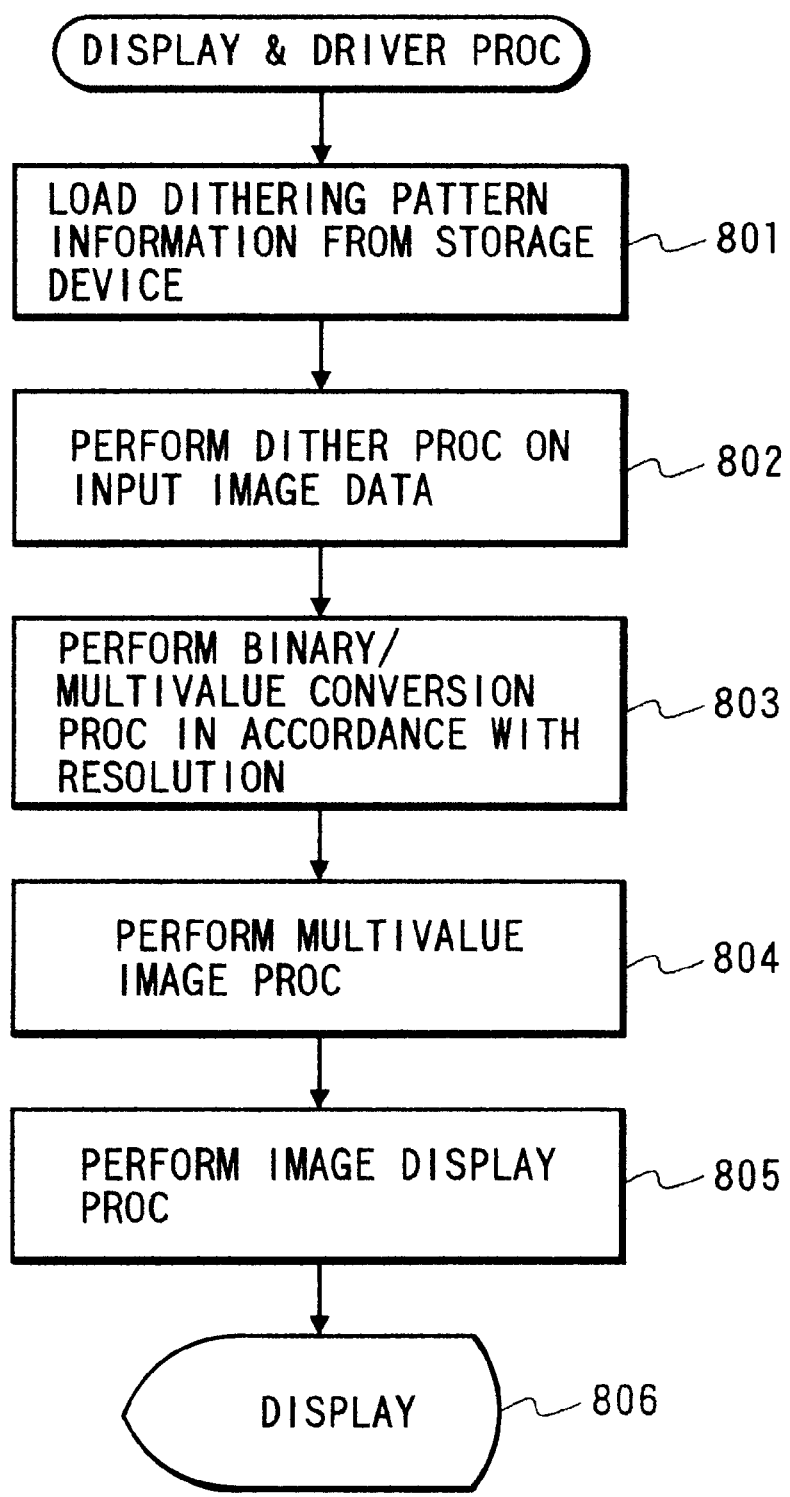
FIG. 8 is a flowchart showing an example of a pattern display process in the display driver which is provided in the program memory of the host system according to the embodiment.

FIG. 8 is a flowchart for a control process of the display control program (display driver) existing in the program memory RAM 106 in the host system 100.

First, the dithering pattern which is used in the printer is loaded from the RAM 106 or the storage device of the disk 103 (801).

In step 802, input multivalue image data is dither processed by using the loaded dithering pattern. Thus, the same recording binary signal as the format that is outputted by the printer is formed.

The recording binary signal is converted into a multivalue signal (803) in accordance with a display size, a resolution of the display, a print size, and a print resolution, namely, in accordance with a ratio of the resolutions of the display and printer (since the resolution of the printer is generally higher than that of the display) when the sizes are equal. As a binary/multivalue conversion, it is sufficient to use a conventional well-known method of counting the number of "1" of the binary signal in the region or the like.

In step 804, a multivalue image process is executed by performing a filtering process to the multivalue signal or the like.

In step 805, the multivalue signal derived in step 804 is converted into a luminance signal for display. Further, the luminance signal is subjected to various filtering processes such as a color space compression and the like as necessary in accordance with characteristics of the display and the resultant signal is displayed on the display (806).

According to the embodiment, therefore, in order to perform the two-way communication between the host system and the printer by using the parallel I/F based on the Centronics having the two-way communication protocol, the dedicated two-way communication control process is executed by the program memories of the host system and printer. The printer driver to control the printer existing in the program memory of the host system transmits an instruction notification to the printer in order to obtain the dithering pattern (dither matrix) information which is installed in the printer and is used to realize the dither processing method for forming a binary image by dither processing the input image pattern. The printer which receives the obtaining instruction notification up-loads the information to the host system. The printer driver in the host system obtaining the above information executes a format conversion and a pattern developing process in order to enable the dithering pattern to be recognized on the operating system and display driver. According to the pattern which is displayed and outputted to the display and the pattern which is printed by the printer, the pattern developing process is executed and the patterns are outputted on the basis of the same dithering pattern information, so that the coincidence between the display output and the print result can be realized.

Embodiment 2

According to the embodiment 2, in the printer driver existing in the program memory of the host system shown in FIG. 1, there is executed a dithering process for fetching the dithering pattern information which was up-loaded from the printer into the pattern forming process in the driver and for converting a color image (multivalue image) pattern similar to the pattern to be installed in the printer into a binary image pattern on the host system side and for forming such a binary image pattern.

In order to realize a process to generally perform the dithering process to the image pattern which is inputted, particularly, a dither processing method of converting the color image (multivalue image) pattern into a binary image pattern and forming such a binary image pattern, since a time occupied by the CPU and a memory consumption amount when the pattern is formed by a dithering pattern requested increase, by executing those processes on the host system side, the processing operation in the printer is reduced, the CPU and memory resources can be saved, and the costs can be decreased.

Embodiment 3

According to the embodiment 3, in addition to the dithering pattern (dither matrix) information from the printer shown in FIG. 1, a numerical value (density correction parameter) which is formally expressed and is used to correct a color density and gradation expression of the dithering pattern is simultaneously up-loaded, thereby performing a pattern forming control process. Thus, an optimized high quality image pattern can be obtained.

Embodiment 4

According to the embodiment 4, in place of the I/O parallel interface based on the Centronics with the two-way communication protocol for connecting the host system and the printer shown in FIG. 1, an input/output serial interface or SCSI interface based on RS-232C or RS-424 with the conventional two-way communication protocol is used, thereby executing the printer driver existing in the program memory RAM 106 in the host system 100 shown in FIG. 1, the two-way communication control process existing in the memory ROM 115 of the printer 112, and the transmission and reception of the dithering pattern information data.

Embodiment 5

According to the embodiment 5, the processing portion in which the dedicated two-way communication control process of FIG. 5 is executed from the printer driver existing in the program memory RAM 106 in the host system 100 shown in FIG. 1 and the dithering pattern (dither matrix) information which is installed in the printer 112 is up-loaded from the printer 112 and the processing portion in which the format conversion is performed so as to enable the relevant dithering pattern to be recognized on the operating system and display driver in FIG. 7 are stored into the program memory RAM 106 in the host system 100 as a dedicated up-loading and format conversion processing program of the dithering pattern information. Thus, the up-loading and format conversion of the dithering pattern information are preliminarily executed from the printer 112 to the host system 100. The output control process of the pattern is performed by the printer driver and display driver and the same pattern can be also displayed, outputted, and printed.

Embodiment 6

According to the embodiment 6, the dedicated up-load processing program of the dithering pattern (dither matrix) information installed in the printer shown in the embodiment 5 is always provided in the program memory RAM 106 in the host system 100 shown in FIG. 1. Likewise, the up-load processing program is arbitrarily read out from the printer driver or display driver existing in the program memory RAM 106 in the host system 100. The dithering pattern (dither matrix) information is up-loaded from the printer 112. The output control process of the pattern is executed in the printer driver and display driver, thereby displaying, outputting, and printing the same pattern.

According to the embodiment as described above, an efficient apparatus with respect to an image output can be provided. Further, for example, the dither processing method of converting the color image (multivalue image) pattern which is inputted from the host system to the printer into the binary image pattern is realized. The dithering pattern (dither matrix) information is up-loaded. On the basis of this information, the pattern forming and output control process is performed by the printer driver or display driver and the pattern is outputted. Thus, the following effects are obtained.

(1) By using the pattern output control method whereby the dithering pattern information installed in the printer is up-loaded to the host system and the same image pattern is formed and outputted to the printer and display by the printer driver and display driver on the host system by using the dithering pattern information, there is an effect such that the more advanced WYSIWYG (What You See Is What You Get) can be realized as compared with the conventional method of forming and outputting a pseudo pattern or the closest pattern in each apparatus.

(2) In one printer driver corresponding to a plurality of printer apparatuses having the same control processing system, even if the dithering pattern information which is installed for a plurality of printer apparatuses is different, each of the dithering pattern information can be obtained without preparing the dithering pattern information installed in the printer into the printer driver. There are consequently advantages such that the memory amount which is occupied by the information data area in the printer driver can be reduced or becomes unnecessary and the memory consumption amount when operating the printer driver can be reduced.

(3) With respect to the storage device such as memory, disk, or the like, in general, the host system can provide a storage device of lower costs and a larger memory capacity as compared with the printer. According to the invention, the dithering pattern information is up-loaded from the printer to the host system and a process for converting the color image (multivalue image) pattern into the binary image pattern and forming the binary image pattern is performed on the host system side. Thus, in order to realize a process to perform the dithering process to the image pattern which is inputted, particularly, the dither processing method of converting the color image (multivalue image) pattern into the binary image pattern and forming the binary image pattern, an occupation time and memory consumption amount of the CPU when the pattern is formed by the dithering pattern to be requested generally increase. However, according to the invention, the processing operation in the printer is reduced and the CPU and memory resources can be saved. There is no need to prepare a CPU of a high performance and a memory having a large capacity and a storage device such as a disk or the like for the printer. Thus, there is an advantage such that the printer of low costs can be provided.

Further, as another embodiment of the invention, a few dithering patterns are prepared in the printer driver and the dithering process is performed in both of the printer driver and the display driver (or the operating system for display) by using the same selected dithering pattern, so that WYSIWYG can be realized with a small memory capacity.

That is, the printer driver is always provided in the memory RAM 106 or disk 103 in FIG. 1 and a plurality of dithering patterns are prepared in the printer driver. In the host system 100, when the operator selects a desired dithering pattern, the display driver (or the operating system for display) receives the dithering pattern from the printer driver. The display driver (or the OS to display) executes the processes in FIG. 8 and displays the image according to the selected and received dithering pattern onto the display.

If the operator likes the display image, he instructs to print out it. If the operator doesn't like the display image, he selects another dithering pattern and again displays.

When the printing-out is instructed, the printer driver executes the processes in FIG. 6 or 7 in accordance with the same selected dithering pattern and executes the printing.

As mentioned above, since the display driver shares the dithering pattern which the printer itself or the printer driver has, the memory of the dithering pattern can be omitted from the display driver and WYSIWYG can be further realized.

By executing the binary/multivalue conversion according to the resolution of the display on the display driver side, an image equivalent to a print output can be obtained on the display.

The present invention is not limited to the foregoing embodiments but many modifications and variations are possible within the spirit and scope of the appended claims of the invention.

What is claimed is:

1. A printing system comprising a host computer and a plurality of printing apparatuses, said host computer being capable of bi-directional communication with said printing apparatuses through communication means, with each of said printing apparatuses comprising:

a memory storing a dither pattern for generating tone-degraded image data based on print data;

image forming means for executing a tone-degrading process on print data input from the host computer, the tone-degrading process using the dither pattern stored in said memory, and for forming an output image;

receiving means for receiving, from the host computer through the communication means, an instruction to request the dither pattern stored in said memory; and sending means for sending the dither pattern stored in said memory to the host computer through the communication means in response to the instruction, wherein the host computer executes a tone-degrading process on the print data using the dither pattern in order to display a tone-degraded image.

2. An image processing method for performing image processing in a printing system in which a host computer is capable of bi-directional communication with a plurality of printing apparatuses, and in which each of the printing apparatuses perform the steps of:

storing a dither pattern for generating tone-degraded image data based on print data;

executing a tone-degrading process on input image data for printing, input from the host computer, by using the stored dither pattern;

outputting the tone-degraded processed image data to an image forming unit;

receiving an instruction from the host computer to request the dither pattern to be used in the tone-degrading process; and sending the dither pattern to the host computer to be used in the tone-degrading process in response to the instruction, wherein the dither pattern used in the tone-degrading process for printing is also used by the host computer to form a tone-degraded image for displaying.

3. A computer-readable medium storing computer-readable program code for an image processing method for performing image processing in a printing system in which a host computer is capable of bi-directional communication with a plurality of printing apparatuses, and in which each of the printing apparatuses performs the steps of:

storing a dither pattern for generating tone-degraded image data based on print data;

executing a tone-degrading process on input image data for printing, input from the host computer, by using the stored dither pattern;

outputting the tone-degraded processed image data to an image forming unit;

receiving an instruction from the host computer to request the dither pattern to be used in the tone-degrading process; and sending the dither pattern to the host computer to be used in the tone-degrading process in response to the instruction, wherein the dither pattern used in the tone-degrading process for printing is also used by the host computer to form a tone-degraded image for displaying.

4. A printing program for an image processing method for performing image processing in a printing system in which a host computer is capable of bi-directional communication with a plurality of printing apparatuses, and in which each of the printing apparatuses performs the steps of:

storing a dither pattern for generating tone-degraded image data based on print data;

executing a tone-degrading process on input image data for printing, input from the host computer, by using the stored dither pattern;

outputting the tone-degraded processed image data to an image forming unit;

receiving an instruction from the host computer to request the dither pattern to be used in the tone-degrading process; and sending the dither pattern to the host computer to be used in the tone-degrading process in response to the instruction, wherein the dither pattern used in the tone-degrading process for printing is also used by the host computer to form a tone-degraded image for displaying.

5. An image processing method for executing an image process to generate a display image, in a system having an image processing apparatus connected to a plurality of printers, said method comprising the steps of:

inputting, to the image processing apparatus, a dither pattern to be used in a tone-degrading process executed in one of the printers;

executing the tone-degrading process on image data for display by using the dither pattern inputted from the printer; and executing a conversion process corresponding to a characteristic of a display device, on the tone-degraded processed image, wherein each of the printers comprises:

means for storing a dither pattern for generating tone-degraded image data based on print data;

means for executing the tone-degraded process using the stored dither pattern on input image data; and means for outputting the tone-degrading processed image data to an image processing unit.

6. An image processing apparatus, connected to a plurality of printers, for executing an image process to generate a display image, said apparatus comprising:

inputting means for inputting a dither pattern to be used in a tone-degrading process executed in one of the printers;

first executing means for executing the tone-degrading process on image data for display by using the dither pattern inputted from the printer; and second executing means for executing a conversion process corresponding to a characteristic of a display device, on the tone-degraded processed image, wherein each of the printers comprises:

means for storing a dither pattern for generating tone-degraded image data based on print data;

means for executing the tone-degrading process using the stored dither pattern on input image data; and means for outputting the tone-degraded processed image data to an image processing unit.

7. A program for performing an image processing method for executing an image process to generate a display image, in a system having an image processing apparatus connected to a plurality of printers, the method comprising the steps of:

inputting, to the image processing apparatus, a dither pattern to be used in a tone-degrading process executed in one of the printers;

executing the tone-degrading process on image data for display by using the dither pattern inputted from the printer; and executing a conversion process corresponding to a characteristic of a display device, on the tone-degraded processed image, wherein each of the printers comprises:

means for storing a dither pattern for generating tone-degraded image data based on print data;

means for executing the tone-degrading process using the stored dither pattern on input image data; and means for outputting the tone-degraded processed image data to an image processing unit.

8. A system according to claim 1, wherein information representing a kind of dither pattern is received in the reception operation by said receiving means.

9. A system according to claim 1, wherein said host computer generates a bit map pattern based on the dither pattern.

10. A system according to claim 1, wherein said host computer performs color space compression to the print data.

11. A method according to claim 2, wherein information representing a kind of dither pattern is received in said receiving step.

12. A method according to claim 2, wherein the host computer generates a bit map pattern based on the dither pattern.

13. A method according to claim 2, wherein the host computer performs color space compression to the print data.

14. A medium according to claim 3, wherein information representing a kind of dither pattern is received in said receiving step.

15. A medium according to claim 3, wherein the host computer generates a bit map pattern based on the dither pattern.

16. A medium according to claim 3, wherein the host computer performs color space compression to the print data.

17. A program according to claim 4, wherein information representing a kind of dither pattern is received in said receiving step.

18. A program according to claim 4, wherein the host computer generates a bit map pattern based on the dither pattern.

19. A program according to claim 4, wherein the host computer performs color space compression to the print data.

20. A method according to claim 5, wherein the conversion process corresponding to the characteristic of the display device is a color space compression process.

21. An apparatus according to claim 6, wherein the conversion process corresponding to the characteristic of the display device is a color space compression process.

22. A program according to claim 7, wherein the conversion process corresponding to the characteristic of the display device is a color space compression process.

* * * * *

UNITED STATES PATENT AND TRADEMARK OFFICE
CERTIFICATE OF CORRECTION

PATENT NO. : 6,646,759 B1  Page 1 of 1
DATED : November 11, 2003
INVENTOR(S) : Hiroshi Koga It is certified that error appears in the above-identified patent and that said Letters Patent is hereby corrected as shown below:

<u>Column 5,</u>
Line 20, "an ROM" should read -- a ROM --;
Line 49, "115 an" should read -- 115 a --; and
Line 57, "denotes an" should read -- denotes a --.

<u>Column 14,</u>
Line 61, "out it." should read -- it out. --

Signed and Sealed this

Twenty-fourth Day of February, 2004

JON W. DUDAS
*Acting Director of the United States Patent and Trademark Office*